Patented Apr. 27, 1937

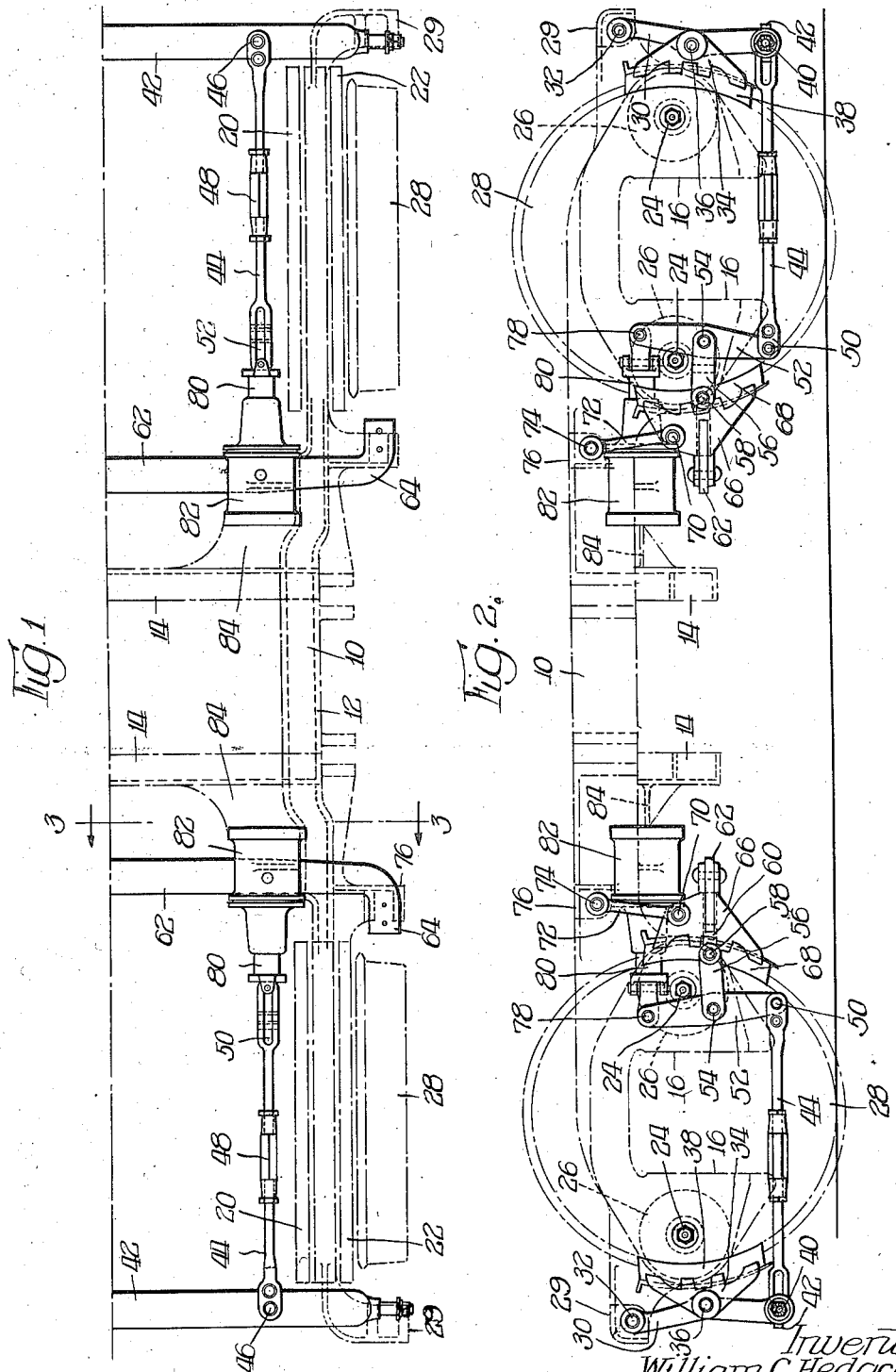

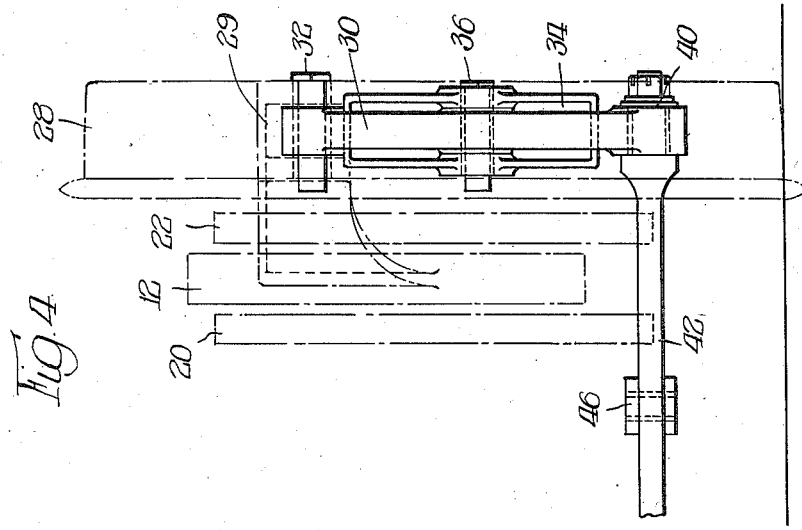
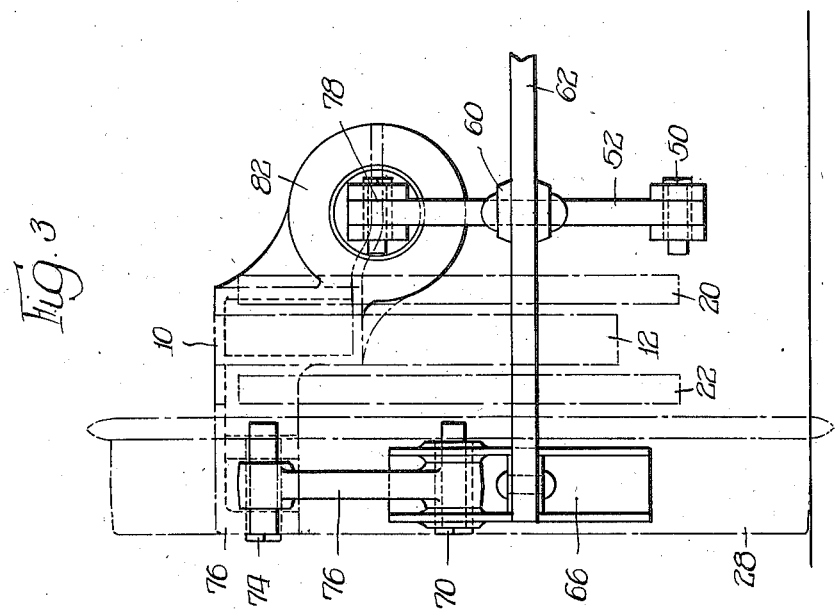

2,078,916

UNITED STATES PATENT OFFICE 2,078,916

BRAKE ARRANGEMENT

William C. Hedgcock, Wilmette, Ill., assignor to American Steel Foundries, Chicago, Ill., a corporation of New Jersey Application February 23, 1935, Serial No. 7,694

30 Claims. (Cl. 188—56)

This invention relates to railway car trucks and brake mechanism particularly adapted for the new type of light high-speed cars.

An object of the invention is to provide a truck and brake arrangement which is particularly adapted for use on the new light high speed railway cars in which clearance conditions are relatively limited.

Another object is to provide a truck and brake arrangement in which the various parts are relatively located to occupy the minimum amount of space and yet will permit of efficient operation.

Still another object is to provide a truck and brake combination particularly for the new light high-speed railway cars adapted to meet the various requirements for successful operation and service.

A further object is to provide a truck wherein certain brake operating means is cast integral with the truck frame.

A yet further object of the invention is to provide an inboard truck and brake arrangement therefor wherein brake cylinders for operating the brake arrangement are cast integral with the truck frame adjacent the inside of each wheel.

Still a further object of the invention is to provide a truck resiliently mounted on wheel and axle assemblies for relative movements in a plurality of directions with respect thereto wherein the brake mechanism is supported on said side frame.

With these and various other objects in view the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a railway car truck embodying the invention, it being understood that the other half of said car truck is symmetrical with the half shown;

Figure 2 is a fragmentary side elevation of the arrangement shown in Figure 1;

Figure 3 is a fragmentary sectional elevation taken substantially in the plane as indicated by the line 3—3 of Figure 1;

Figure 4 is a fragmentary end elevation of the arrangement shown at the left end of the truck as viewed in Figures 1 and 2.

In the truck construction illustrated, which is of the inboard type, the truck frame 10 consists essentially of the side frames 12, the side frames on each side of the truck being integrally connected by means of the transoms 14 spaced apart to provide a bolster opening for the reception of a bolster (not shown). The side frame adjacent the ends thereof is provided with the spaced jaws or pedestals 16 adapted to loosely receive journal means having cooperative engagement with the wheel and axle assemblies 18. Inner and outer wing castings 20 and 22 are disposed on each side of the side frames adjacent the jaws 16, being secured to said side frame by means of the bolts 24 disposed on each side of the journal opening. Rubber or resilient doughnuts or disks 26 are disposed between the wing castings and the side frame in order to provide a resilient connection between the wheel and axle assemblies and the side frame, thus permitting limited relative angling or movement between the wheel and axle assemblies 28 and the side frame.

The wing castings are provided with jaws directly cooperating with the wheel and axle assemblies, thus forming an intermediate connection between said wheel and axle assemblies and the side frames. The side frames adjacent the ends thereof are provided with the outwardly extending brackets 29 and end brake hanger levers 30 are pivotally connected as at 32 adjacent the upper ends thereof to the brackets 29. The brake heads 34 are pivotally connected as at 36 to the hanger levers 30 intermediate the ends of said levers and are provided with the brake shoes 38 adapted to have braking cooperation with the outer periphery of the wheels of the wheel and axle assemblies. The lower ends of the hanger levers 30 are pivotally connected as at 40 to the outer brake beams 42, said brake beams connecting hanger levers at opposite sides of the truck.

The pull rod 44 is pivotally connected as at 46 to the outer brake beam 42 and is disposed inboard of the truck, being made adjustable by means of the turnbuckle 48. The inner end of said pull rod is pivotally connected as at 50 to the lower end of the vertically disposed live cylinder lever 52. The live lever 52 is pivotally connected intermediate the ends thereof as at 54 to the link 56, said link being pivoted as at 58 to the brake beam fulcrum 60 connected to the inner brake beam 62. The brake beam 62 is substantially U-shaped in plan, each end 64 thereof being adapted to have affixed thereto inner brake head 66 provided with brake shoe 68 adapted to have braking cooperation with the inner periphery of the adjacent wheel of the wheel and axle assembly.

The brake heads 66 are pivotally connected as at 70 to the hanger link 72, said hanger link being pivotally connected as at 74 to the inner outwardly projecting brake hanger bracket 76 provided on the side frame 12. The upper end of the live lever 52 is pivotally connected as at 78 to the piston rod 80 of the brake cylinder 82 (said cylinder preferably being cast integral with the side frame adjacent the transom 14), and with the transom 14 through the integral bracket 84. In this brake arrangement two brake cylinders are provided for the brake rigging of each wheel and axle assembly, the cylinders being disposed adjacent the transoms or stationary load carrying member and the side frames.

In operation of this form of brake rigging, outward movement of the piston 80 toward the adjacent end of the truck causes movement of the inner brake beam 62 to cause application of the inner brake shoe 68 to the inner periphery of the associated wheel. Continued movement of the piston 80 causes rotation of the cylinder lever 52 about the pivot 54, thus causing the pull rod 44 to move the outer brake beam 42, and consequently the lower end of the inner lever 30 inwardly, whereupon the outer brake shoe 38 is caused to be moved into braking engagement with the outer periphery of the wheel of the associated wheel and axle assembly. Release of the brake fluid will cause movement of the brake rigging in a direction opposite to that necessary to apply the brakes.

With the arrangement shown, the wheel and axle assemblies support the truck frame and are permitted limited angular movements with respect thereto through the resilient connection. The brake rigging, however, is carried by the truck frame. Though an inboard type of truck is provided, and an integral brake cylinder is shown, it is of course appreciated that the brake linkage may be used with the conventional type of truck with separate brake cylinders, and the journal means may be through a conventional type of journal box.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a truck frame, a wheel and axle assembly disposed in supporting relation thereto, a hanger lever pivotally connected adjacent its upper end to said truck frame, a brake beam connected to said hanger lever adjacent the lower end thereof, a brake head connected to said hanger lever intermediate the ends thereof, a brake cylinder supported by said truck frame, a cylinder lever disposed on the opposite side of the axle from said hanger lever and pivotally connected adjacent the upper end thereof to the piston of said cylinder, a pull rod connecting said brake beam and the lower end of said cylinder lever, a brake beam having a brake head thereon supported from said truck frame and disposed on the opposite side of said wheel from said first named brake beam, and a connection between said second named brake beam and said cylinder lever.

2. In a brake arrangement, the combination of a truck frame, a wheel and axle assembly disposed in supporting relation thereto, a hanger lever pivotally connected adjacent its upper end to said truck frame, a brake beam connected to said hanger lever adjacent the lower end thereof, a brake head connected to said hanger lever intermediate the ends thereof, a brake cylinder supported by said truck frame, a cylinder lever disposed on the opposite side of the axle from said hanger lever and pivotally connected adjacent the upper end thereof to the piston of said cylinder, a pull rod connecting said brake beam and the lower end of said cylinder lever, a brake beam having a brake head thereon supported from said truck frame and disposed on the opposite side of said wheel from said first named brake beam, and a connection between said cylinder lever intermediate the ends thereof and said second named brake beam.

3. In a brake arrangement, the combination of a truck frame, a wheel and axle assembly disposed in supporting relation thereto, a hanger lever pivotally connected adjacent its upper end to said truck frame, a brake beam connected to said hanger lever adjacent the lower end thereof, a brake head connected to said hanger lever intermediate the ends thereof, a live lever disposed on the opposite side of the axle from said hanger lever and pivotally connected adjacent the upper end thereof to operating means for said arrangement, a pull rod connecting said brake beam and the lower end of said live lever, a brake beam having a brake head thereon supported from said truck frame and disposed on the opposite side of said wheel from said first named brake beam, and a connection between said live lever intermediate the ends thereof and said second named brake beam.

4. In a brake arrangement, the combination of a truck frame, a wheel and axle assembly disposed in supporting relation thereto, a hanger lever pivotally connected adjacent its upper end to said truck frame, a brake beam connected to said hanger lever adjacent the lower end thereof, a brake head connected to said hanger lever intermediate the ends thereof, a live lever disposed on the opposite side of the axle from said hanger lever and pivotally connected adjacent the upper end thereof to operating means for said arrangement, a pull rod connecting said brake beam and the lower end of said live lever, a brake beam having a brake head thereon supported from said truck frame and disposed on the opposite side of said wheel from said first named brake beam, and a connection between said second named brake beam and said cylinder lever.

5. In a brake arrangement, the combination of a railway car truck having a side frame and a truck wheel, brake mechanism for applying braking action to said wheel, said mechanism including a brake cylinder carried by said side frame at one side thereof and to the same side of said truck wheel, said cylinder being disposed inboard of said side frame, said side frame having a projection extending to the other side of said side frame and from which said brake mechanism is supported, one of the supporting members from said projection being a lever disposed in the plane of the adjacent wheel.

6. In a brake arrangement, the combination of a railway car truck having a truck side frame and a truck wheel, brake mechanism including brakes adapted to be applied to opposite sides of said wheel, and a brake cylinder carried by said side frame on one side thereof and inboard of said side frame, said side frame having lateral projections from which said brake mechanism is supported, one of the supporting members from each of said projections being a lever disposed in the plane of the adjacent wheel.

7. In a brake arrangement, the combination of a truck frame including a side frame and a transverse connecting member, a wheel disposed in supporting relation to said truck frame, a dead lever supported on said side frame in the plane of said wheel, a brake head secured to said dead lever intermediate the ends of said lever, a live cylinder lever disposed inwardly of said wheel and connected adjacent the lower end thereof to the lower end of said dead lever, and a cylinder supported on said truck frame and having a piston connected to the upper end of said cylinder lever.

8. In a brake arrangement, the combination of a truck frame including a side frame and a transverse connecting member, a wheel disposed in supporting relation to said truck frame, a dead lever supported on said side frame in the plane of said wheel, a brake head secured to said dead lever intermediate the ends of said lever, a live cylinder lever disposed inwardly of said wheel and connected adjacent the lower end thereof to the lower end of said dead lever, and a brake head connected to said live lever intermediate the ends thereof.

9. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake beam disposed on the opposite side of the wheels from said first named brake beam and having a brake head for each wheel provided thereon, a live lever connected intermediate the ends thereof to said second named brake beam and adjacent the lower end thereof to said first named brake beam, and operating means connected to the upper end of said live lever.

10. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake beam disposed on the opposite side of the wheels from said first named brake beam and having a brake head for each wheel provided thereon, a live lever connected intermediate the ends thereof to said second named brake beam and adjacent the lower end thereof to said first named brake beam, and operating means for said brake arrangement, said operating means including a brake cylinder the piston of which is connected to the upper end of said live lever.

11. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake beam disposed on the opposite side of the wheels from said first named brake beam and having a brake head for each wheel provided thereon, a live lever connected intermediate the ends thereof to said second named brake beam and adjacent the lower end thereof to said first named brake beam, and operating means for said brake arrangement, said operating means including a brake cylinder disposed on said side truck frame, the piston of said cylinder being connected to the upper end of said live lever.

12. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake head for each wheel disposed on the opposite side of the wheel from said first named heads, a live lever connected intermediate the ends thereof to said second named heads and adjacent the lower end thereof to said first named brake beam, and operating means connected to the upper end of said live lever.

13. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake head for each wheel disposed on the opposite side of the wheel from said first named heads, a live lever connected intermediate the ends thereof to said second named heads and adjacent the lower end thereof to said first named brake beam, and operating means for said brake arrangement, said operating means including a brake cylinder the piston of which is connected to the upper end of said live lever.

14. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam disposed on the opposite side of the wheels from said first named brake heads and having a brake head for each wheel provided thereon, a live lever connected intermediate the ends thereof to said second named brake beam and adjacent the lower end thereof to said first named brake heads, and operating means connected to the upper end of said live lever.

15. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam disposed on the opposite side of the wheels from said first named brake heads and having a brake head for each wheel provided thereon, a live lever connected intermediate the ends thereof to said second named brake beam and adjacent the lower end thereof to said first named brake heads, and operating means for said brake arrangement, said operating means including a brake cylinder the piston of which is connected to the upper end of said live lever.

16. In a brake arrangement, the combination of a truck frame including a side frame and a transverse connecting member, a wheel disposed in supporting relation to said truck frame, a dead lever supported on said side frame in the plane of said wheel and adjacent one end of said side frame, a brake head secured to said dead lever intermediate the ends of said lever, a live cylinder lever disposed inwardly of the plane of said wheel and connected adjacent the lower end thereof to the lower end of said dead lever, an inner brake head connected to said live cylinder lever intermediate its ends, and a cylinder supported on said truck frame and having a piston connected to the upper end of said cylinder lever.

17. In a brake arrangement, the combination of a truck frame including a side frame and a transverse connecting member, a wheel disposed in supporting relation to said truck frame, a dead lever supported on said side frame in the plane of said wheel, a brake head secured to said dead lever intermediate the ends of said lever, a live cylinder lever disposed inwardly of said wheel and connected adjacent the lower end thereof to the lower end of said dead lever, and a cylinder supported on said truck frame and having a piston connected to the upper end of said cylinder lever, said cylinder being disposed wholly below the top of said truck frame.

18. In a brake arrangement, the combination of a truck frame including a side frame and a transverse connecting member, a wheel disposed in supporting relation to said truck frame, a dead lever supported on said side frame in the plane of said wheel and adjacent one end of said side frame, a brake head secured to said dead lever intermediate the ends of said lever, a live cylinder lever disposed inwardly of the plane of said wheel and connected adjacent the lower end thereof to the lower end of said dead lever, an inner brake head connected to said live cylinder lever intermediate its ends, and operating means for said brake arrangement connected to the upper end of said cylinder lever.

19. In a brake arrangement, the combination of a truck frame including a side frame and a transverse connecting member, a wheel disposed in supporting relation to said truck frame, a dead lever supported on said side frame in the plane of said wheel and adjacent one end of said side frame, a brake head secured to said dead lever intermediate the ends of said lever, a live cylinder lever disposed inwardly of the plane of said wheel and connected adjacent the lower end thereof to the lower end of said dead lever, an inner brake head connected to said live cylinder lever intermediate its ends, and a cylinder supported on said truck frame and having a piston connected to the upper end of said cylinder lever, said cylinder being disposed inboard of said side frame.

20. In a brake arrangement, the combination of a truck frame including a side frame and a transverse connecting member, a wheel disposed in supporting relation to said truck frame, a dead lever supported on said side frame in the plane of said wheel, a brake head secured to said dead lever intermediate the ends of said lever, a live cylinder lever disposed inwardly of said wheel and connected adjacent the lower end thereof to the lower end of said dead lever, and a cylinder supported on said truck frame and having a piston connected to the upper end of said cylinder lever, said cylinder being disposed wholly below the top of said truck frame and inboard thereof.

21. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake beam disposed on the opposite side of the wheels from said first named brake beam and having a brake head for each wheel provided thereon, a live lever connected intermediate the ends thereof to said second named brake beam and adjacent the lower end thereof to said first named brake beam, and operating means for said brake arrangement, said operating means including a brake cylinder the piston of which is connected to the upper end of said live lever, said cylinder being disposed inboard of said side frame.

22. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake beam disposed on the opposite side of the wheels from said first named brake beam and having a brake head for each wheel provided thereon, a live lever connected intermediate the ends thereof to said second named brake beam and adjacent the lower end thereof to said first named brake beam, and operating means for said brake arrangement, said operating means including a brake cylinder the piston of which is connected to the upper end of said live lever, said cylinder being disposed inboard of said side frame and wholly below the top thereof.

23. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake beam disposed on the opposite side of the wheels from said first named brake beam and having a brake head for each wheel provided thereon, a live lever connected intermediate the ends thereof to said second named brake beam and adjacent the lower end thereof to said first named brake beam, and operating means for said brake arrangement, said operating means including a brake cylinder disposed on said truck frame, the piston of said cylinder being connected to the upper end of said live lever, said cylinder being disposed inboard of said side frame.

24. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake beam disposed on the opposite side of the wheels from said first named brake beam and having a brake head for each wheel provided thereon, a live lever connected intermediate the ends thereof to said second named brake beam and adjacent the lower end thereof to said first named brake beam, and operating means for said brake arrangement, said operating means including a brake cylinder disposed on said truck frame, the piston of said cylinder being connected to the upper end of said live lever, said cylinder being disposed inboard of said side frame and wholly below the top thereof.

25. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake head for each wheel disposed on the opposite side of the wheel from said first named heads, a live lever connected intermediate the ends thereof to said second named heads and adjacent the lower end thereof to said first named brake beam, and operating means for said brake arrangement, said operating means including a brake cylinder the piston of which is connected to the upper end of said live lever, said cylinder being disposed inboard of said side frame.

26. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam connecting said dead levers adjacent the ends thereof, a brake head for each wheel disposed on the opposite side of the wheel from said first named heads, a live lever connected intermediate the ends thereof to said second named heads and adjacent the lower end thereof to said first named brake beam, and operating means for said brake arrangement, said operating means including a brake cylinder the piston of which is connected to the upper end of said live lever, said cylinder being disposed inboard of said side frame and wholly below the top thereof.

27. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam disposed on the opposite side of the wheels from said first named brake heads and having a brake head for each wheel provided thereon, a live lever connected intermediate the ends thereof to said second named brake beam and adjacent the lower end thereof to said first named brake heads, and operating means for said brake arrangement, said operating means including a brake cylinder the piston of which is connected to the upper end of said live lever, said cylinder being disposed inboard of said side frame.

28. In a brake arrangement, the combination of a truck frame including a side frame and a transverse connecting member, a wheel and axle assembly disposed in supporting relation to said truck frame, said assembly including a wheel adjacent each side frame, a dead lever supported from each side frame in the plane of the adjacent wheel, a brake head connected to each dead lever intermediate the ends thereof, a brake beam disposed on the opposite side of the wheels from said first named brake heads and having a brake head for each wheel provided thereon, a live lever connected intermediate the ends thereof to said second named brake beam and adjacent the lower end thereof to said first named brake heads, and operating means for said brake arrangement, said operating means including a brake cylinder the piston of which is connected to the upper end of said live lever, said cylinder being disposed inboard of said side frame and wholly below the top thereof.

29. In a brake arrangement, the combination of a four-wheel truck, clasp brakes disposed adjacent each wheel, and unit cylinder brake means including a cylinder disposed inboard of said truck and adjacent each wheel for operating the clasp brakes of each wheel.

30. In a brake arrangement, the combination of a four-wheel truck, clasp brakes disposed adjacent each wheel, and unit cylinder brake means including a cylinder disposed inboard of said truck and adjacent each wheel for operating the clasp brakes of each wheel, said brake means being disposed wholly below the top of each wheel.

WILLIAM C. HEDGCOCK.